April 10, 1962 E. GENNING 3,029,034

BRAKE FOR REVERSIBLE DRIVE MEANS IN WIRE OR TAPE SOUND RECORDING AND REPRODUCING APPARATUS

Filed April 24, 1958 3 Sheets-Sheet 1

INVENTOR
E. Genning
By
Wenderoth, Lind & Ponack
Attys.

April 10, 1962 E. GENNING 3,029,034

BRAKE FOR REVERSIBLE DRIVE MEANS IN WIRE OR TAPE SOUND RECORDING AND REPRODUCING APPARATUS

Filed April 24, 1958 3 Sheets-Sheet 2

INVENTOR

E. Genning

By Wenderoth, Lind & Ponack

Attys.

April 10, 1962 E. GENNING 3,029,034
BRAKE FOR REVERSIBLE DRIVE MEANS IN WIRE OR TAPE SOUND RECORDING AND REPRODUCING APPARATUS
Filed April 24, 1958 3 Sheets-Sheet 3

INVENTOR
E. Genning
By
Wenderoth, Lind & Ponack
Attys.

United States Patent Office 3,029,034

Patented Apr. 10, 1962

3,029,034

BRAKE FOR REVERSIBLE DRIVE MEANS IN WIRE OR TAPE SOUND RECORDING AND REPRODUCING APPARATUS

Ernst Genning, Buettnerstrasse 12, Hannover, Germany

Filed Apr. 24, 1958, Ser. No. 730,680
Claims priority, application Germany Apr. 24, 1957
6 Claims. (Cl. 242—55.12)

This invention relates to brake mechanism for sound recording and reproducing apparatus employing a wire or tape as the record carrier, and adapted more especially for use in magnetic sound recording apparatus.

In clockwork mechanisms it is already known to provide brake shoes for a balance wheel, said brake shoes being urged by a spiral spring into contact with the balance wheel. However, this form of friction brake cannot move otherwise than from its released into its braking position.

In sound recording and reproducing apparatus employing record carriers the safety and reliability of operation of the drive means depends substantially upon the shape and the functioning of the brake means. If the brakes do not properly apply themselves to the spools on which the record carrier is mounted, the record carrier is liable to flutter and loop with the result that the recording or the reproduction will be distorted and possibly completely interrupted. In reversible drive means every reversal of the direction of rotation of the spools generates considerable inertia effects which may cause the record carrier to break or to be dislodged from the spools if the brakes are of unsatisfactory construction or incorrectly adjusted. The brakes, especially the running brakes, should therefore be designed to apply a contact pressure which is gradually adjustable. Moreover, it should be possible to effect adjustment or corrections in adjustment whilst the apparatus is in operation.

To this end, the present invention provides a brake in which the braking pressure of an elastic torsion element of the brake shoe is arranged to be gradually adjustable.

The elastic torsion element may be in the form of a spiral spring of known type with an approximately linear rate. Alternatively a highly elastic rubber ring may be employed.

The elastic torsion element is accommodated inside a rotary spindle bearing of a double-armed lever type friction brake. In one arrangement according to the present invention, the top of this rotary bearing is closed by a spur wheel located on the spindle in the rotary bearing by means of a centering bush. The rotary bearing contains the elastic torsion element which can be biased to any degree of fine adjustment by the spur wheel.

To wind up the elastic torsion element of each brake lever a pinion on a shaft located parallel to the spindle of the brake meshes with the teeth of the spur wheel. This pinion is rotatably mounted on the bedplate supporting the drive means and a ratchet gear is provided to retain the pinion in any position to which it is set.

According to another feature of the invention the running and stop brakes associated with each spool are mounted on the bedplate of the drive means so that their pivots are in alignment and the brakes are disposed, one above the other, in the manner of the two hands of a clock.

Alternatively, only the pinion associated with one brake is rotatably mounted on the bedplate and provided with a ratchet, whereas the pinion associated with the other brake is adjusted by means of a worm mounted on a bracket.

The disposition of the brakes according to the present invention has the advantage of being extremely compact and of ensuring reliability of operation in any position of the apparatus, as well as when the direction of rotation of the drive means is reversed. The storage of energy in a spring at all times provides an accurately adjustable and controllable amount of braking pressure. When taking advantage of the freedom from fatigue and the uniformity of pressure throughout a wide deflection range of a spiral steel spring, contact pressure is determined by the flatness of the function $Md/n$, where M represents the spring modulus and $d$ the spring distortion, $n$ representing the number of complete revolutions when the spring is wound up. The individual members of each brake assembly are similar and hence interchangeable, and they can be easily removed and re-assembled. Finally, the brake mechanism of the present invention permits the tolerance range of the energy storage means to be more coarsely or finely adjusted according to requirements.

The brakes and brake mechanism proposed by the invention are particularly suitable for reversing drive means controlled by a reversing slide. The lower brakes of each assembly may be used as stop brakes loosely entrained by a first slide which engages projections on the brake arms, whereas the upper brakes may be running brakes operated by a second slide having adjustable contact screws co-operating with an arm extending in the opposite direction to the actual brake arm.

A preferred embodiment of the invention is illustrated by way of example, in the accompaning drawings, in which.

Figure 1:
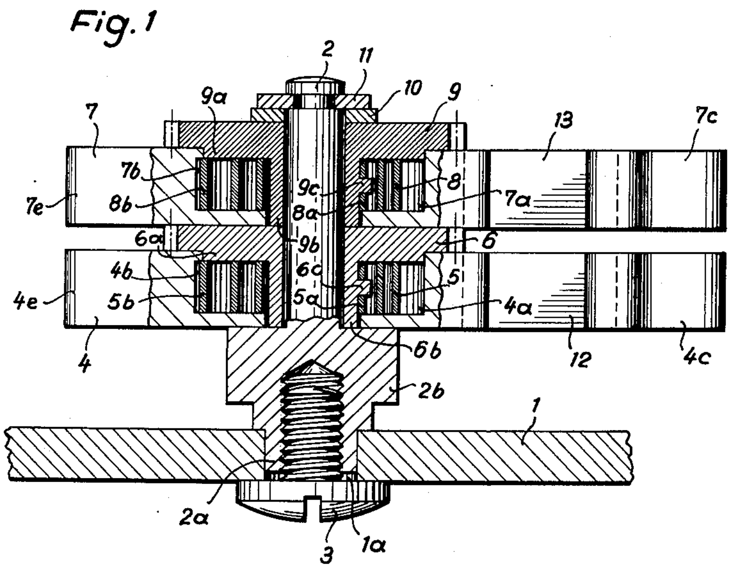
FIG.1 is a vertical section of a brake assembly comprising a running and a stop brake, the section being taken on the line A—B of FIG. 2.
Figure 2:
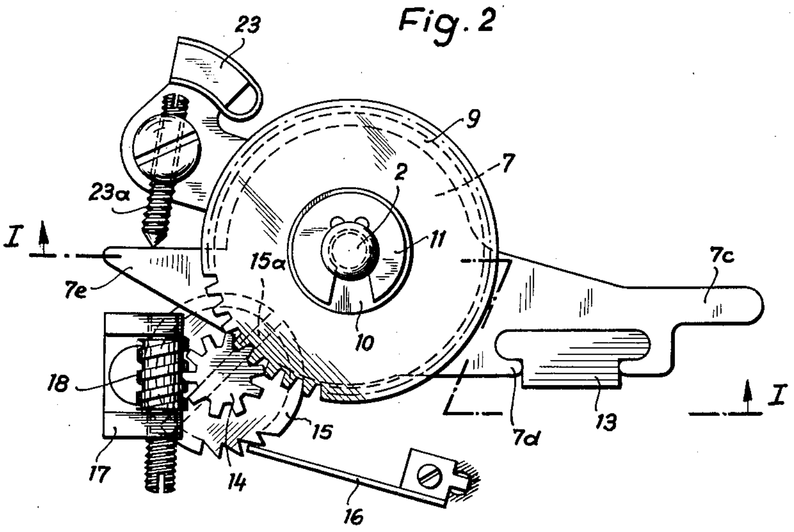
FIG. 2 is a plan view of the brake assembly shown in FIG. 1, the pinions, worm, and ratchet being diagrammatically indicated.
Figure 3:
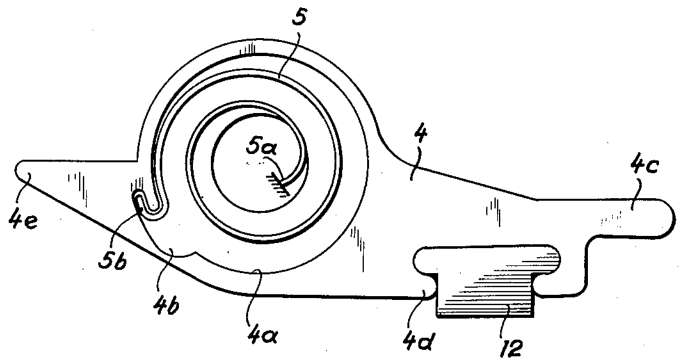
FIG. 3 is a plan view of a single brake lever and of an energy storing element associated therewith.
Figures 4, 5:
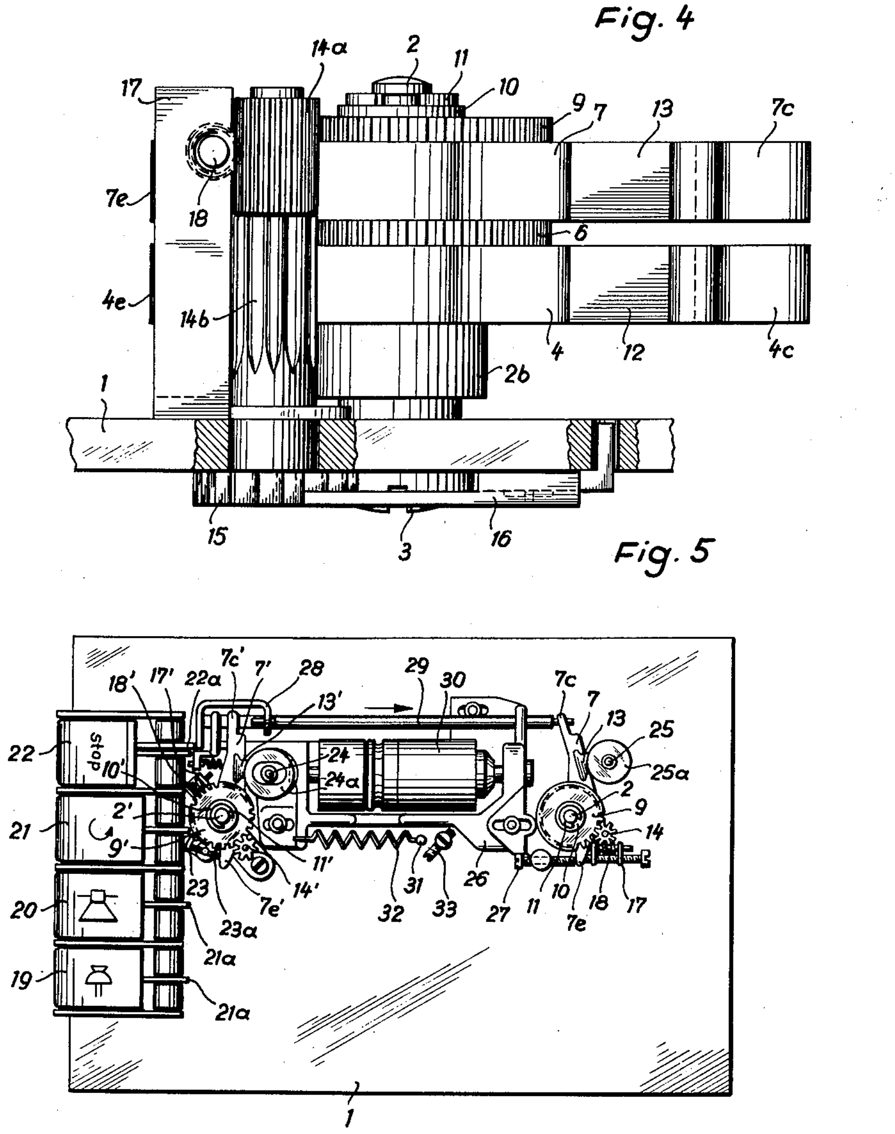
FIG. 4 is a side view of the brake assembly having a divided pinion, and a worm and ratchet gear.
FIG. 5 is a plan view of a key-controlled reversing mechanism and brake assembly according to the invention, the brakes being operated by two slides.

The drive means for the brake mechanism is mounted on a bedplate 1 provided with an opening 1*a* for a brake spindle 2 which is provided with flats 2*a* or the like. The brake spindle 2 is detachably secured to the bedplate 1 by means of a screw 3.

A concentric collar 2*b* carries a two-armed lever brake 4 which in the illustrated example is adapted to perform the functions of a stop brake. A deep concentric recess 4*a* surrounding the spindle 2 of brake 4 serves to accommodate the energy storage means 5. In the illustrated example the energy storage means is embodied in a spirally wound flexible spring which has an approximately linear rate of tensioning.

The top of the recess 4*a* is closed by the spur wheel 6 which is centered in relation to brake 4 by a centering boss 6*a* and a centering bushing 6*b*. The centering bushing 6*b* carries a projection or the like 6*c* for anchoring an end 5*a* of the energy storage means 5, and the other end 5*b* of the latter is secured in a slot 4*b* arranged concentrically with respect to the recess 4*a*.

The brake 7, which in the illustrated example constitutes the running brake, is similar in construction to the stop brake 4 and likewise comprises a concentric recess 7*a*, an energy storage means 8, a centering boss 9*a*, a centering bushing 9*b* and a projection 9*c*. This brake 7 is loosely rotatably mounted on the spur wheel 6 of brake 4. The two brakes 4 and 7 are held on spindle 2 by a plate 10 and an elastic washer 11.

Held in undercut recesses 4*d*, and 7*d* in brake arm 4*c* of brake 4 and brake arm 7*c* of brake 7, are renewable brake linings 12, 13. For winding up the energy storage means 5 and 8, the spur wheels 6 and 9 of the stop brake 4 and of the running brake 9 are engaged by a divided pinion 14, rotatably mounted on the bedplate 1 in such manner that the upper portion **14*a* of pinion 14 meshes with spur wheel 9, whereas the lower portion 14*b* meshes with spur wheel 6. The energy storage means of stop brake 4 is wound by a ratchet wheel 15 mounted coaxially with pinion 14 underneath the bedplate 1. A ratchet lever 16 secured to the underside of the bedplate 1 prevents pinion 14 from being rotated in an unwinding direction by the energy storage means 5. It will be readily understood that the ratchet lever 16** may be of some other structural type, for instance a spring-loaded element.

The running brake 9 is wound by means of a worm 18 mounted in a bracket 17. As the worm 18 is self-locking, the provision of a ratchet mechanism can be dispensed with.

For reasons of space or for other reasons it may be preferred to provide separate elements for winding the energy storage means. In such a case the spur wheel 6 of the stop brake 4 will be engaged by a pinion 14 underneath which the ratchet gear 15, 16 is arranged, and the energy storage means 8 will be separately wound by means of the worm 18 mounted on bracket 17 and engaging spur wheel 9.

Control keys 19, 20, 21, 22 are mounted on the bedplate 1 of the driving gear. These keys control the several modes of operation in a manner that is well understood. Key 19 is depressed when the apparatus is required to record, 20 is a play-back key, 21 a rewinding key, and 22 a stop key for stopping the apparatus. The keys are suitably marked for indentification. During the rewinding operation, a projection **21*a* of the rewinding key 21 is pushed against a control lever 23, rotatably mounted on a brake spindle 2', so that an adjustable contact screw 23*a* on said lever will be urged against arm 7*e'* of the running brake 7'. The rewinding spindle 24 and a friction disc 24*a* are therefore released by brake arm 7*c'* of the running brake 7', whereas brake arm 7*c* of the running brake 7 brakes the forward winding spindle which is mounted at 25 and which idles during the rewinding operation, by pressing against the friction disc 25*a*** thus ensuring that the record carrier remains taut.

During this process a contact screw 27 on a slide 26 acts on arm **7*e* of the running brake 7. When the record carrier has been rewound completely the stop key 22 is depressed. This causes projection 22*a* to push against angle piece 28. A push rod 29 arranged axially in slide 26 is rigidly connected with angle piece 28. Owing to the depression of the stop key 22 against the action of a spring member not shown, angle piece 28 and push rod 29 are displaced in the direction of the arrow. This displacement of the push rod 29 entrains the brake arms 4*c*, 4*c'*, of stop brakes 4, 4' and applies the latter to the spool spindles or their brake discs and stops the apparatus. The drive element, such as a coupling roller, which is rotatably mounted in the slide is indicated at 30. A spring 32 attached, on the one hand, to the slide 26 and on the other hand, anchored at point 31, pulls the slide back into its original position when the apparatus is stopped. The contact screw 33 serves as a limit stop for slide 26**.

I claim:

1. In a sound recording and reproducing apparatus employing a wire or tape mounted on a spool as the record carrier, a friction brake for said spool, comprising a non-rotatable spindle, a two-armed brake lever rotatably mounted on said spindle and carrying friction brake means and a spiral spring in said lever, means for anchoring one end of said spiral spring to said lever, a gear wheel on said spindle, means for anchoring the other end of said spiral spring on said wheel, means for rotating said wheel in one direction, and means for preventing rotation of said wheel in the opposite direction.

2. In a sound recording and reproducing apparatus employing a wire or tape mounted on a spool as the record carrier, a friction brake for the spool comprising a two-armed brake lever, a spindle on which said lever is mounted, a spiral spring in said lever, means for anchoring one end of said spiral spring to said lever, a gear wheel on said spindle, means for anchoring the other end of said energy storage means to said wheel, a pinion for rotating said wheel, and a ratchet for preventing rotation of said wheel in one direction.

3. In a sound recording and reproducing apparatus employing a wire or tape mounted on a spool as the record carrier, a friction brake for the spool comprising a double-armed lever, a spindle on which said lever is mounted, said lever having a recess therein, a spiral spring in said recess, a spur wheel on said spindle, and means whereby said spur wheel can be rotated, the spiral spring being attached to said spindle, whereby the rotation of said wheel tensions said spiral spring.

4. A brake mechanism for an electric acoustic apparatus comprising a bedplate, a non-rotatable spindle supported thereon, a pair of double-armed levers on said spindle, a spiral spring on each lever one end of each spring being secured to each lever, spur wheels on said spindle, means for securing the other end of said springs to said spur wheels, means for rotating said spur wheels to tension said elements, and a brake lining on each of said levers.

5. A brake mechanism for an electric acoustic apparatus comprising a bed plate, a shaft carried thereby, a two armed lever on said shaft, said lever having a recess therein, a spiral spring in said recess, means for attaching one end of said spring to said lever, a spur wheel on said shaft, means for attaching the other end of said spring to said wheel, a pinion for rotating said wheel and tensioning said spring, a brake lining on one arm of said lever, a second double-armed lever on said shaft, said second lever having a recess therein, a second spiral spring in said recess, means for attaching an end of said second spiral spring to said second lever, a second spur wheel on said shaft, means for attaching the other end of said second spiral spring to said second spur wheel, a worm for rotating said second spur wheel to tension said second spring, and a second brake lining on one arm of said second lever.

6. A brake mechanism according to claim 5, wherein one lever is a stop brake, a first slide which bears against one arm on said one lever, and the other lever is a running brake, and a second slide bearing against the arm extending in the opposite direction from the arm on said other lever having the brake lining thereon.

References Cited in the file of this patent

UNITED STATES PATENTS

| | | |
|---|---|---|
| 245,906 | Willett | Aug. 16, 1881 |
| 681,932 | Skirrow | Sept. 3, 1901 |
| 1,040,768 | Ryon | Oct. 8, 1912 |
| 1,654,915 | Blair | Jan. 3, 1928 |
| 2,555,643 | Harrison | June 15, 1951 |
| 2,610,808 | Davis | Sept. 16, 1952 |
| 2,726,555 | McGrath | Dec. 13, 1955 |
| 2,782,263 | Hoehn et al. | Feb. 19, 1957 |
| 2,824,705 | Bowman | Feb. 25, 1958 |